(12) United States Patent
Khulief

(10) Patent No.: US 9,482,593 B2
(45) Date of Patent: Nov. 1, 2016

(54) SELECTABLE MULTI-AXIS SHAKER TABLE

(71) Applicant: KING FAHD UNIVERSITY OF PETROLEUM AND MINERALS, Dhahran (SA)

(72) Inventor: Yehia Abel Khulief, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 269 days.

(21) Appl. No.: 14/489,435

(22) Filed: Sep. 17, 2014

(65) Prior Publication Data

US 2016/0076966 A1 Mar. 17, 2016

(51) Int. Cl.
*G01M 7/06* (2006.01)
*G01M 7/02* (2006.01)

(52) U.S. Cl.
CPC ..................... *G01M 7/06* (2013.01)

(58) Field of Classification Search
CPC ......... G01M 7/02; G01M 7/06; G01M 7/027
USPC ........................... 73/662, 663, 667, 669, 670
See application file for complete search history.

(56) References Cited

U.S. PATENT DOCUMENTS

| | | | |
|---|---|---|---|
| 2,438,756 A | 3/1948 | Larsen | |
| 3,049,292 A | 7/1962 | Matthews | |
| 3,277,697 A * | 10/1966 | Wittkuhns | G01M 7/04 73/667 |
| 4,265,123 A | 5/1981 | Cappel | |
| 4,446,742 A | 5/1984 | Thompson, Jr. et al. | |
| 4,875,374 A | 10/1989 | Pinson | |
| 2002/0005069 A1* | 1/2002 | Nichols | G01M 7/06 73/577 |
| 2012/0180593 A1* | 7/2012 | Alet | B25J 9/0042 74/490.07 |
| 2015/0185108 A1* | 7/2015 | Baek | G01M 7/027 73/669 |

FOREIGN PATENT DOCUMENTS

GB         386985        1/1933

* cited by examiner

*Primary Examiner* — Michael A Lyons
*Assistant Examiner* — Suman K Nath
(74) *Attorney, Agent, or Firm* — Richard C. Litman

(57) ABSTRACT

The selectable multi-axis shaker table may be adjusted to produce reciprocating linear motion parallel to any one or more of three mutually orthogonal axes, and/or to produce rotary reciprocating motion about its longitudinal axis. The device is driven by a single linear actuator, e.g., a hydraulic or pneumatic ram, linear motor, etc. The device includes a fixed lower base, an intermediate plate adjustably linked to the base, and an upper platform adjustably linked to the intermediate plate. By adjusting one or more of the various linkages between the base, intermediate plate, and upper platform, and/or adjusting the location of the receiver link and linear actuator to the mechanism, the selectable multi-axis shaker table may produce motion of the table platform parallel to its major horizontal axis (X-axis), minor horizontal axis (Y-axis), and/or its vertical axis (Z-axis), and can further produce reciprocating rotary motion of the platform about its X-axis.

6 Claims, 6 Drawing Sheets

SELECTABLE MULTI-AXIS SHAKER TABLE

BACKGROUND OF THE INVENTION

1. Field of the Invention

The present invention relates generally to testing and measuring devices and equipment, and particularly to a selectable multi-axis shaker table. The operator of the device may select one or more linear axes, and/or one rotary axis, all driven by a single drive unit.

2. Description of the Related Art

The shaker table (or shaking table, or vibration table) can be an important tool in structural dynamics testing, durability testing of electronic components, and other uses. Innumerable variations of shaker tables have been constructed in the past. Their sizes vary greatly for the testing of different articles ranging from small mechanical or electronic devices up to dynamic testing of full-size structures for earthquake resistance. Such shaker tables can also vary considerably in the number of degrees of motion that they produce, from a single linear or rotational axis up to and including three mutually orthogonal linear axes and three mutually orthogonal rotary axes of motion.

The conventional means of constructing a multi-axis shaker table has required a separate actuator or driver for each axis. This, in turn, requires a digital control system in order to command each driver separately and independently. Accordingly, the cost of production, operation, and maintenance of such multi-axis shaker tables has increased dramatically in comparison to a simpler single axis shaker table.

Thus, a selectable multi-axis shaker table solving the aforementioned problems is desired.

SUMMARY OF THE INVENTION

The selectable multi-axis shaker table comprises a rigid, stationary base, an intermediate plate supported thereabove, and a table platform supported above the intermediate plate. A single linear driver (hydraulic ram, linear electric motor, pneumatic ram, etc.) is connected to the intermediate plate (or to a sliding bar along the base, in some configurations) to translate the intermediate plate (or the bar along the base) linearly and parallel to the major horizontal axis (the X-axis) of the device. The intermediate plate is supported on wheels that, in turn, ride in slots or tracks in the upper surface of the base.

A toothed rack is provided along the bar atop the base. A cooperatively toothed pinion gear engages the rack. The pinion gear, in turn, drives a jackscrew that extends horizontally across the width of the intermediate plate, i.e., parallel to the Y-axis of the device. Movement of the plate back and forth over the base results in rotation of the pinion gear and corresponding rotation of the screw. A threaded nut travels along the screw as the screw is rotated. The nut drives a linkage between the plate and the upper platform.

The lower end of the driven linkage, i.e., the end in contact with the intermediate plate, is free to move in the direction of the Y-axis according to the travel of the traveling nut on the threaded shaft. The upper end of the driven linkage is pivotally affixed to the bottom of the platform. Two more linkage sets are pivotally affixed between the intermediate plate and the platform to hold the platform parallel to the intermediate plate when all of the linkages are connected therebetween.

The selectable multi-axis shaker table may be adjusted in numerous ways to provide reciprocating motion along the X, Y, and/or Z (vertical) axes, as well as reciprocating rotary motion about the X-axis of the device. Disconnecting one of the pivotally affixed linkages between the intermediate plate and the upper platform allows the platform to rotate about the X-axis of the device. Disconnection of the pinion gear removes reciprocation of the driven linkage, and thus the platform, along the Y-axis. Allowing the bar to move with movement of the intermediate plate and switching the drive to the bar rather than the intermediate plate and locking the movement of the intermediate plate along the X-axis results in the device producing reciprocating linear movement along only the Y and Z (vertical) axes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
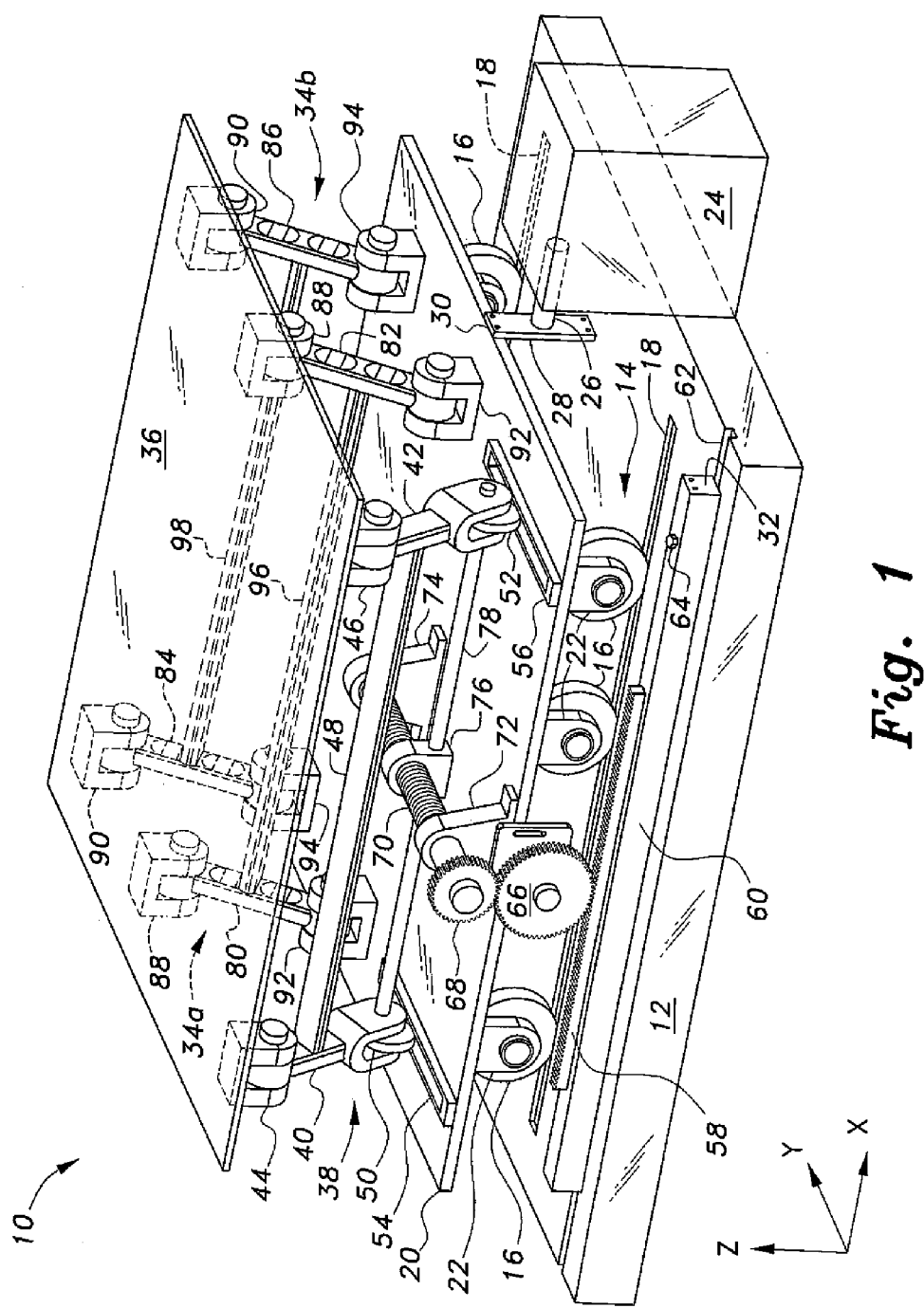
FIG. 1 is a perspective view of a selectable multi-axis shaker table according to the present invention, illustrating its structure and various features.

The selectable multi-axis shaker table enables the user of the device to select any or all of a series of reciprocating axes. The axes of motion include a longitudinal (X) linear axis, a lateral (Y) linear axis, a vertical (Z) linear axis, and angular reciprocation about the longitudinal or X axis. FIG. 1 of the drawings provides a perspective view of the selectable multi-axis shaker table or shaker table 10. The longitudinal X-axis extends horizontally generally left to right in FIG. 1, the Y-axis extends horizontally from the nearest edge to the opposite distal edge of the device, and the Z-axis extends vertically, as indicated respectively by the X-, Y-, and Z-orientation arrows in FIG. 1.

The shaker table 10 includes a rigid base 12 upon which the remainder of the mechanism is installed. A carriage 14 has a plurality of wheels 16 that ride in two laterally spaced parallel slots or grooves 18 disposed in the upper surface of the base 12. The slots or grooves 18 are parallel to the longitudinal or X-axis of the device. An intermediate plate 20 is supported above the base 12 by the carriage 14. The intermediate plate 20 has a plurality of bosses 22 immovably affixed thereto and depending therefrom. Each of the carriage wheels 16 is captured by a corresponding boss 22. Thus, the intermediate plate 20 can roll back and forth along the X-axis of the device by means of the carriage 14 and its wheels 16.

Figure 3:
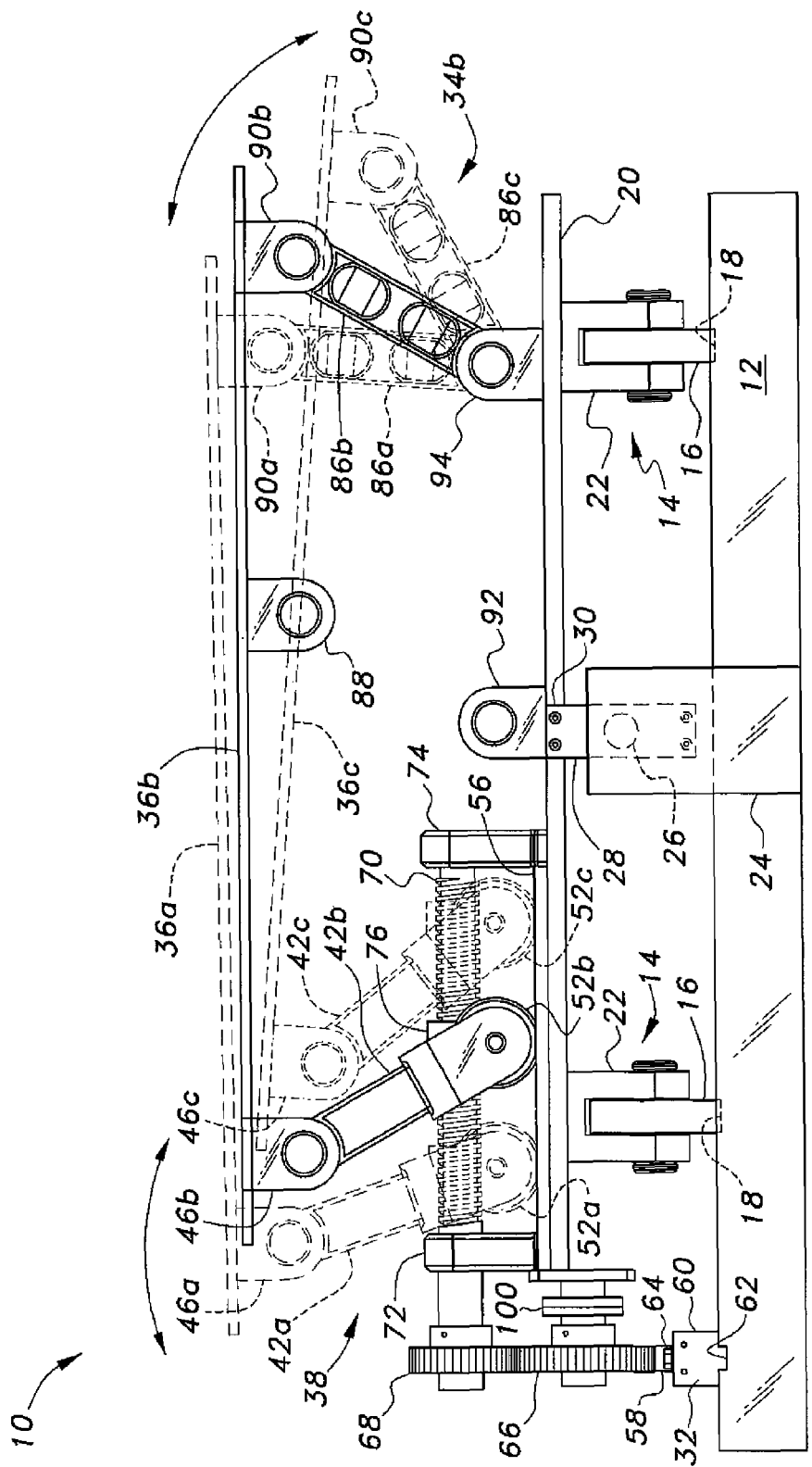
FIG. 3 is a right side elevation view of the selectable multi-axis shaker table of FIG. 1, illustrating its adjustment for linear motion about one or more of the axes and angular motion about the X axis.
Figure 4:
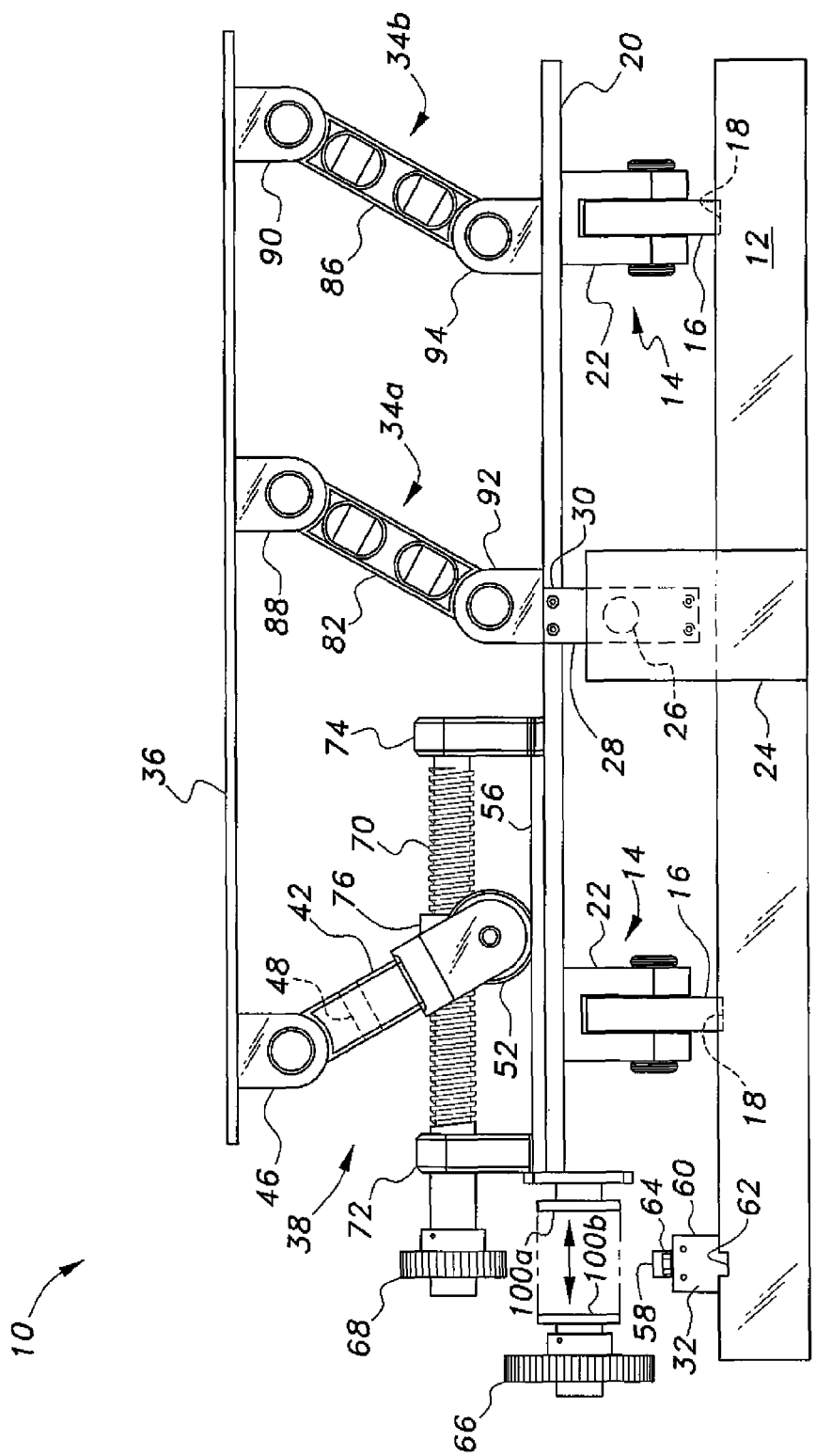
FIG. 4 is a right side elevation view of the selectable multi-axis shaker table of FIG. 1, illustrating its adjustment for operation along the X-axis only.
Figure 5:
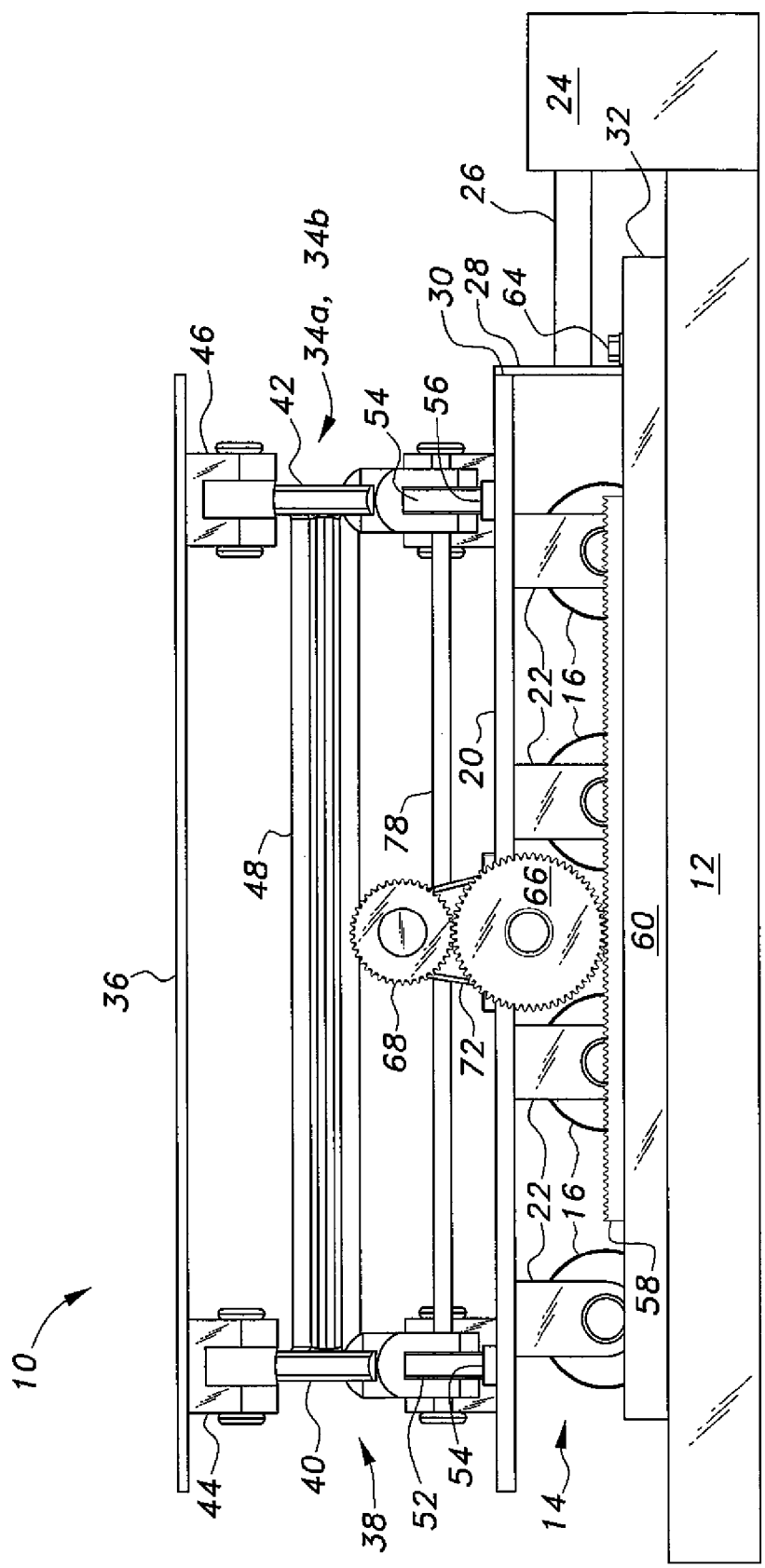
FIG. 5 is a front elevation view of the selectable multi-axis shaker table of FIG. 1, illustrating further details of its structure and various features.
Figure 6:
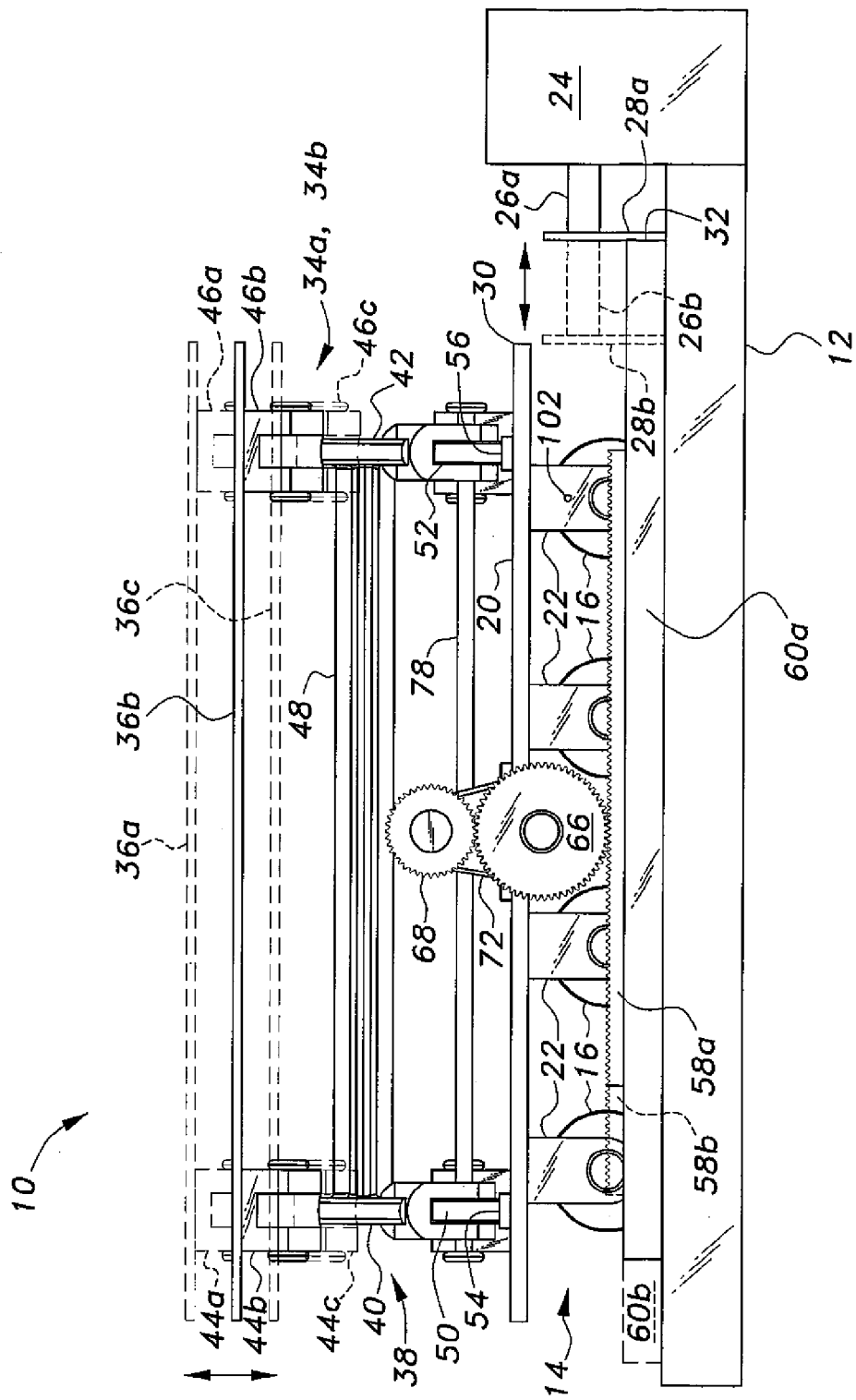
FIG. 6 is a front elevation view of the selectable multi-axis shaker table according to the present invention, illustrating its adjustment for operation along the Y- and Z-axes.

A single linear actuator 24 is adjustably affixed to the base 12, e.g., to the right end of the base 12, as shown in FIGS. 1, 5, and 6. The linear actuator 24 may comprise any of a number of known devices, e.g., a reciprocating hydraulic or pneumatic ram or cylinder, a linear electrical motor, a rotary motor having a crank or other mechanism to convert the rotary motion to linear motion, etc. The actuator 24 reciprocates a drive pin 26 extending from an actuator connector 28. The drive pin 26 reciprocates linearly along the X-axis of the shaker table 10. The actuator connector 28 may be selectively attached to one of the two actuator attachment points, i.e., the first actuator attachment point 30 on the intermediate plate 20 (as shown in FIGS. 1 through 4), or alternatively, attached to the second actuator attachment point 32 on the end of a bar or rail atop the base 12 (as shown in FIGS. 5 and 6). The linear actuator 24 is selectively affixed to the base plate 12 and oriented to produce reciprocating linear motion of the drive pin 26 along the longitudinal X-axis of the shaker table 10. The attachment of the linear actuator 24 to the base plate 12 corresponds to the specific actuator attachment point 30 or 32 being used according to the motion desired for the shaker table 10.

Articulating parallel linkages extend upward from the top of the intermediate plate 20. The parallel linkages comprise an intermediate linkage assembly 34a and a rear linkage assembly 34b. Linkages 34a and 34b are parallel to one another and are passive, articulating according to input from an actuator link 38 described further below. The parallel linkages 34a, 34b support an upper platform 36 above the intermediate plate 20. The linkages 34a, 34b provide for reciprocating linear translation of the upper platform 36 along the lateral or Y-axis of the shaker table 10, as well as reciprocating angular rotation of the upper platform 36 when certain adjustments are made to the intermediate linkage 34a. The actuator link mechanism 38 is driven to articulate the upper platform 36 for the desired motion, according to certain adjustments to the shaker table 10. The actuator link 38 comprises left and right (or first and second) actuator arms 40 and 42 that are pivotally secured to the bottom of the upper platform 36 by bosses or lugs 44 and 46. A connecting member 48 locks the two actuator arms 40 and 42 rigidly to one another so that the two actuator arms 40 and 42 move in unison with one another. Each of the two actuator arms 40, 42 includes a roller 50, 52 extending from its lower end or extension. The rollers 50 and 52 ride in tracks or slots 54, 56 formed in the upper surface of the intermediate platform 20.

The actuator linkage 38 is driven by a rack and pinion/jackscrew mechanism. A toothed rack 58 is immovably affixed to an elongate bar or rail 60 that is captured in a slot or groove 62 formed in the upper surface of the base 12 parallel to the X-axis of the shaker table 10. The bar or rail 60 may be immovably secured to the base 12 by a bolt 64 or other suitable fastener, or may be released by removal of the bolt 64 to move along its slot or groove 62 according to the specific axes of motion desired, as explained further below. A pinion gear 66 is rotatably secured to the intermediate platform 20 and selectively engages the toothed rack 58 to rotate due to relative movement of the rack 58 and gear 66. The pinion gear 66 may be disengaged from the rack 58 to change the axes of motion as desired, as explained further below. The pinion gear 66 may engage a jackscrew drive gear 68 disposed between the pinion gear 66 and the driven end of a jackscrew 70. The jackscrew 70 is secured above the upper surface of the intermediate plate 20 between the intermediate plate 20 and the overlying upper platform 36 and parallel to the Y-axis of the device by a pair of bosses or lugs 72, 74 that extend upward from the intermediate plate 20. The pinion gear 66 and jackscrew drive gear 68 comprise a gear train between the rack 58 and the driven end of the jackscrew 70. It will be seen that the jackscrew drive gear 68 may be eliminated if the pinion gear is of sufficient diameter and is secured directly to the driven end of the jackscrew 70, depending upon the relative direction of rotation desired for the jackscrew 70 and travel for the upper platform 36. However, the use of separate pinion and jackscrew drive gears 66 and 68 is desired to allow the pinion gear 66 to be disengaged readily, for reasons explained further below.

A traveling nut 76 is cooperatively threaded upon the jackscrew 70. A crossmember 78 extends rigidly to each side of the traveling nut 76. The crossmember 78 serves as the axle for each of the two rollers 50 and 52 of the arms 40 and 42 of the actuator linkage 38. Since the crossmember 78 cannot rotate about the jackscrew 70 and the traveling nut 76 is affixed to the crossmember 78, it will be seen that the traveling nut 76 cannot rotate with rotation of the jackscrew 70. Thus, rotation of the jackscrew 70 results in the traveling nut 76 threading its way along the length of the jackscrew 70, depending upon the direction of rotation of the jackscrew 70. Motion of the traveling nut 76 carries the crossmember 78 across the intermediate plate 20 in the orientation of the Y-axis of the shaker table 10. This rolls the two rollers 50 and 52 in their respective tracks 54 and 56, thus articulating their actuator arms 40 and 42 and the upper platform 36 to which the actuator arms 40 and 42 are pivotally connected.

The upper platform 36 is further supported and separated from the intermediate plate 20 by linkages 34a and 34b extending therebetween, the linkages 34a, 34b being pivotally secured to the intermediate plate 20 and upper platform 36, as noted further above. The linkage 34a comprises left and right or first and second medial arms 80, 82, and the rear linkage 34b comprises left and right (or first and second) rearward arms 84 and 86, i.e., those arms opposite the side having the jackscrew gear train. The four arms 80 through 86 are all equal in length to one another, and their respective upper medial attachment lugs 88 and upper rear attachment lugs 90 are all equally spaced from one another. This is also true of the lower medial attachment lugs 92 and lower rear attachment lugs 94. The two medial arms 80, 82 of the intermediate linkage assembly 34a are rigidly connected to one another by a medial connecting member 96 to require the two arms 80, 82 to move in unison, and the two rear arms 84, 86 of the rear linkage assembly 34b are connected by a rear connecting member 98 in the same manner.

Figure 2:
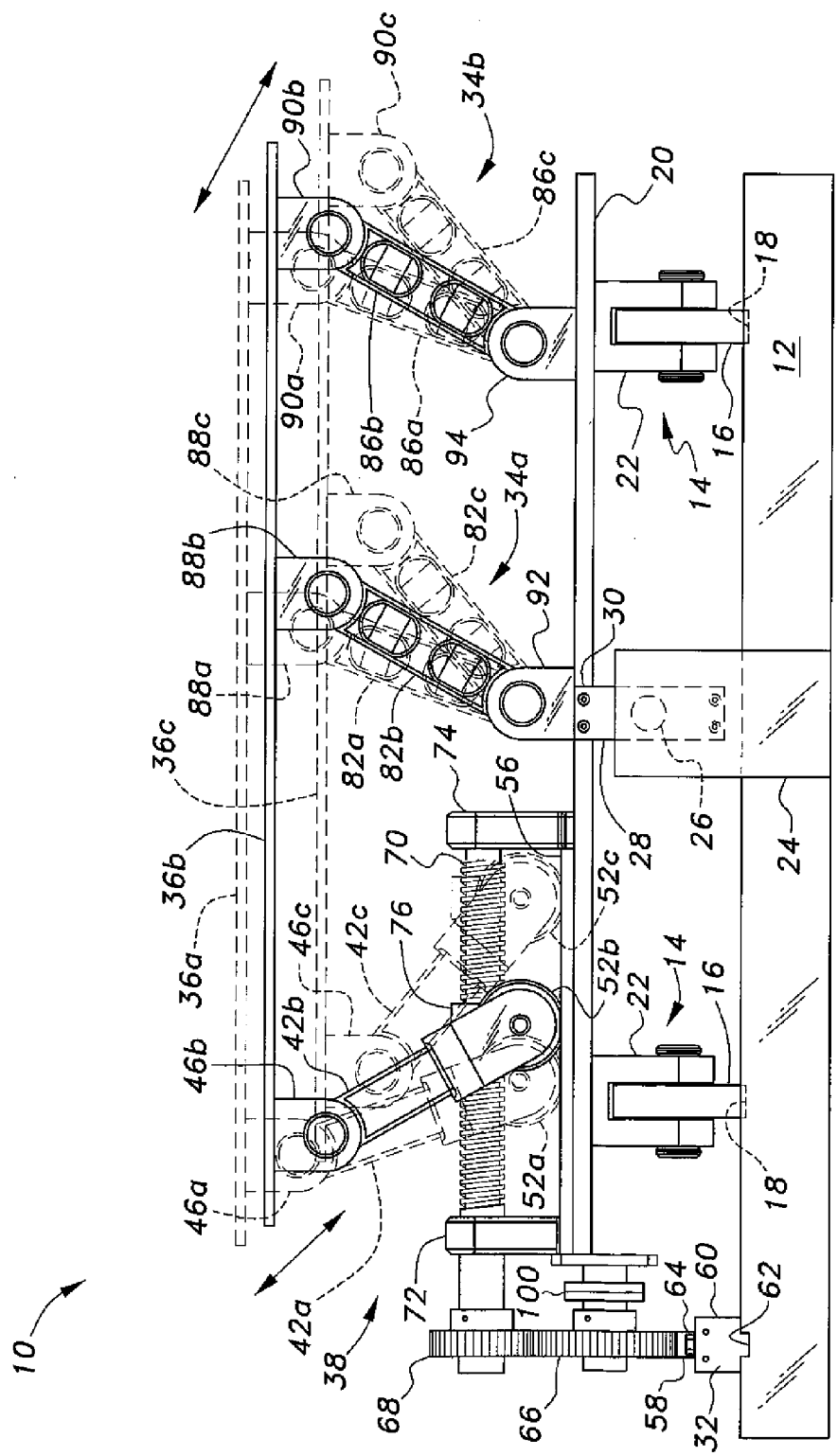
FIG. 2 is a right side elevation view of the selectable multi-axis shaker table of FIG. 1, illustrating its simultaneous operation along X, Y, and Z linear axes.

The selectable multi-axis shaker table 10 is capable of producing reciprocating linear and/or angular motion along or about a number of different axes, as noted further above. FIG. 2 of the drawings illustrates the configuration of the shaker table 10 for producing reciprocating linear motion along all three mutually orthogonal X-, Y-, and Z-axes. The linear actuator 24 is actuated to reciprocate the drive pin or drive shaft 26 parallel to the X-axis, i.e., inward and outward relative to the plane of the drawing in FIG. 2. Since the drive pin 26 is affixed to the actuator connector 28, which is affixed to the intermediate plate 20 at the first actuator attachment point 30, it will be seen that the intermediate plate 20 will reciprocate back and forth parallel to the X-axis of the device, i.e., in and out of the plane of FIG. 2.

This motion of the intermediate plate 20 relative to the base 12 results in the pinion gear 66 rolling along the underlying rack 58 atop the base 12. The rotation of the pinion gear 66 rotates the jackscrew 70 clockwise and counterclockwise as the intermediate plate 20 reciprocates back and forth. This alternating rotary motion of the jackscrew 70 causes the traveling nut 76 to travel back and forth along the jackscrew 70 in a direction parallel to the Y-axis of the mechanism, i.e., left and right in the orientation of FIG. 2.

Since the traveling nut 76 is rigidly affixed to the two arms 40 and 42, it will be seen that the two actuator arms 40 and 42 will also reciprocate parallel to the Y-axis of the device. In FIG. 2, only the second or right end actuator arm 42 is shown, along with the corresponding second or right end medial and rearward arms 82 and 86. FIG. 2 illustrates the range of motion of the arms. The maximum limits and generally medial positions are indicated by the lower case letters a, b, and c for the second actuator arm 42 and the second medial and rearward arms 82 and 86. When the traveling nut 76 has moved closer to the first jackscrew boss 72, the upper platform is raised to its highest position, indicated at 36a in FIG. 2. The upper platform must remain parallel to the intermediate plate 20, as dictated by the kinematics of the parallel mechanism formed by the three link assemblies 38, 34a, and 34b. In operation, none of the three link assemblies is permitted to reach the vertical or neutral position of the shaker table mechanism 10.

As the jackscrew 70 rotates, the traveling nut 76 moves to the right as shown in FIG. 2. This moves the lower ends of the actuator arms 40 and 42 toward the intermediate arms 80 and 82, as shown by the solid line position 42b for the second or right actuator arm. This angular rotation of the actuator arms 40, 42 results in lowering the upper ends of the actuator arms, thus lowering the upper platform to the position shown in solid lines at 36b. The four intermediate and rearward arms 80 through 86 are thus constrained to rotate clockwise, as shown in FIG. 2, and lower their upper ends as well due to their restricting the upper platform to remain parallel to the intermediate plate 20. This results in their positions being generally as shown in solid lines by the two second or right intermediate and rearward arms 82b and 86b.

As the upper ends of the intermediate and rearward arms 80 through 86 rotate clockwise, they draw the upper platform to the right, as shown in FIG. 2 by the solid line position 36b for the platform, i.e., moving the upper platform parallel to the Y-axis. Thus, this configuration of the shaker table 10 results in upper platform linear motion parallel to the X-axis due to the reciprocation of the intermediate platform 20, and simultaneous upper platform linear motion parallel to the Y- and Z-axes due to the articulation of the various arms 40, 42, and 80 through 86 as described above. The upper platform 36 remains parallel to the intermediate plate 20 and the base 12 throughout the entire operation described above.

It may be desirable at times to add a reciprocating angular motion about one of the axes of the shaker table 10. This may be easily accomplished by a simple modification or alteration of the mechanism, as shown in FIG. 3 of the drawings. In FIG. 3, the intermediate link assembly 34a, comprising the two intermediate arms 80 and 82 and the medial connecting member 96, have been removed from the structure. This frees the upper platform 36 from its parallelism to the intermediate plate 20 and the base 12. The lower ends of the two actuator arms 40 and 42 travel back and forth along their roller tracks 54 and 56 due to the operation of the gear train, jackscrew 70, and traveling nut 76, as described further above. This is shown by the progressive positions 42a, 42b, and 42c of the second actuator arm in FIG. 3. The resulting motion of the upper platform, as shown by the platform positions 36a, 36b, and 36c in FIG. 3, causes the remaining linkage 34b (comprising first and second rear arms 84, 86 and the rear connecting member 98) to articulate, as shown by the second rear arm positions 86a, 86b, and 86c. Due to the difference in inclination between the actuator arms 40, 42 and the rearward arms 84, 86, the upper ends of the rearward arms 86 will produce both horizontal and vertical components of motion, and the portion of the upper platform 36 above the rearward arms 86, 88 will experience greater vertical travel than will the portion of the platform above the actuator arms 40, 42. This results in a reciprocating angular motion for the upper platform 36, in addition to the three linear reciprocating motions along the X-, Y-, and Z-axes, as described further above.

It may be desired to eliminate motion along or about the majority of the axes of the shaker table 10, and have linear motion along only a single axis. FIG. 4 is an illustration of the shaker table 10 similar to that of FIG. 2, except for the drive train for the jackscrew 70. The pinion gear 66 is removably secured to the remainder of the structure by a clutch 100 or other easily releasable mechanism. In FIG. 4, the clutch is shown released as two separate components, i.e., a first component 100a that remains attached to the intermediate plate 20, and a second component 100b that remains attached to the pinion gear 66. By selectively disengaging the pinion gear 66 from the structure by means of the clutch 100, rotation of the jackscrew 70 is precluded. Thus, the three linkage assemblies 38, 34a, and 34b that form the actuator parallel linkage become locked relative to one another, and the platform 36 remains parallel and locked to the intermediate plate 20, so long as the jackscrew 70 is disengaged. The only movement permitted by this configuration is along or parallel to the X-axis resulting from the reciprocation of the entire assembly, including the platform 36, by the linear actuator 24. In this configuration, the jackscrew 70 can be locked to prevent any slack motion or mechanical play in the system.

FIG. 5 is a front elevation view of the shaker table 10, having the configuration corresponding to that of FIGS. 1 and 2. This configuration permits the three linear degrees of motion along the three mutually orthogonal X-, Y-, and Z-axes, as described further above for the operation of the configuration of FIG. 2. In FIGS. 1 through 5, the linear actuator 24 is reciprocatingly connected to the intermediate plate 20 by means of the drive pin or shaft 26 and actuator connector 28. FIG. 5 may be compared to FIG. 6, which is also a front elevation view of the shaker table 10. However, it will be noted in FIG. 6 that the actuator connector 28 has been removed from its first actuator attachment point 30 on the intermediate plate 20 and installed upon the second attachment point 32 at the end of the bar or rail 60 on the base 12. The linear actuator 24 is also repositioned on the base 12 to align the drive pin or shaft 26 with the actuator connector 28 in its alternative attachment point 32 to the end of the bar or rail 60.

It will be noted that the bolt 64 shown in FIGS. 1 through 5 that secures the bar or rail 60 immovably to the base 12 has been removed in the configuration of FIG. 6. This permits the linear actuator 24 to reciprocate the bar or rail in its slot or groove 62 (shown in FIGS. 1 through 4) along the X-axis of the device due to the attachment of the actuator connector 28 to the end of the bar or rail, as shown by the positions 26a, 26b of the drive pin or shaft, positions 28a, 28b of the actuator connector, positions 60a, 60b of the bar or rail, and positions 58a, 58b of the toothed rack atop the bar or rail. The linear movement of the bar or rail 60 and its toothed rack 58 along or parallel to the X-axis of the shaker table 10 results in rotation of the pinion gear 66 due to its engagement with the toothed rack 58 atop the bar or rail 60. The reciprocating motion of the upper platform 36 relative to the intermediate plate 20 along the Y- and Z-axes is substantially as shown in FIG. 2 and described further above. However, a pin(s) 102 is/are inserted through one or more of the carriage bosses 22 and corresponding carriage wheels 16 that support the intermediate plate 20, as shown in the right hand carriage boss 22 in FIG. 6. Thus, the intermediate plate 20 is immovably locked relative to the base 12 and cannot reciprocate along the X-axis of the shaker table 10. This configuration allows only two axes of linear motion along the Y- and Z-axes, generally as shown in FIG. 2, while precluding motion along the X-axis.

Accordingly, the selectable multi-axis shaker table 10 may produce reciprocating linear motion along or about one, two, or three mutually orthogonal axes and may produce reciprocating rotational motion, i.e., rocking motion, about the X-axis as well. The shaker table 10 produces linear motion about three mutually orthogonal axes in the configuration illustrated in FIGS. 1, 2, and 5. A fourth degree of motion comprising reciprocating angular motion or rocking motion is achieved when the intermediate linkage 34a (comprising the two intermediate arms 80, 82 and the medial connecting member 96) is removed from the assembly, as shown in FIG. 3. Motion of the shaker table 10 may be reduced to only a single linear axis of motion parallel to the X-axis by removing the pinion gear 66, as shown in FIG. 4 of the drawings. Finally, the shaker table 10 may be limited to only two linear axes of motion by repositioning the actuator connector 28 to the end of the bar or rail 60, relocating the linear actuator 24 to align with this alternative position of the actuator connector 28, unlocking the bar or rail 60 from its base 12 to allow linear motion within its slot or groove 62, and locking the carriage wheels 16 to preclude movement of the intermediate plate 20 relative to the base 12. This versatility is achieved using only a single linear actuator, thus greatly reducing the cost of such a multi-axis shaker table device.

It is to be understood that the present invention is not limited to the embodiments described above, but encompasses any and all embodiments within the scope of the following claims.

I claim:

1. A selectable multi-axis shaker table, comprising:
    a rigid base, wherein a pair of laterally spaced, parallel slots are formed in an upper surface of said rigid base;
    an intermediate plate movably disposed above the base;
    an upper platform movably disposed above the intermediate plate;
    a carriage disposed between the base and the intermediate plate, the carriage supporting the intermediate plate above the base, wherein the carriage comprises a plurality of wheels which are selectively moveable within the pair of laterally spaced, parallel slots formed in the upper surface of said rigid base such that the intermediate plate may be selectively moved linearly in a longitudinal direction with respect to said rigid base; and
    a linkage disposed between the intermediate plate and the upper platform, the linkage supporting the upper platform above the intermediate plate, wherein the linkage comprises a plurality of arms pivotally connected to the intermediate plate and to the upper platform such that the upper platform may be selectively moved in a lateral direction which is orthogonal to the longitudinal direction.

2. The selectable multi-axis shaker table according to claim 1, further comprising a single linear actuator disposed on the base.

3. The selectable multi-axis shaker table according to claim 1, further comprising:
    a selectively sliding toothed rack disposed atop the base;
    at least one actuator attachment point selected from the group consisting of a first actuator attachment point disposed upon the intermediate plate and a second actuator attachment point disposed upon the sliding rack; and
    a single actuator arm selectively attached to one of the actuator attachment points.

4. The selectable multi-axis shaker table according to claim 1, further comprising an actuator link disposed between the intermediate plate and the upper platform, the actuator link being pivotally attached to the upper platform, the intermediate plate having a plurality of tracks disposed thereon, the actuator link having a plurality of lower extensions, each of the extensions having a roller disposed therefrom, each of the rollers riding in a corresponding one of the tracks of the intermediate plate.

5. The selectable multi-axis shaker table according to claim 4, further comprising:
    a jackscrew disposed upon the intermediate plate, below the upper platform;
    a toothed rack disposed upon the base;
    a gear train extending between the rack and the jackscrew, the gear train communicating with the rack and rotating the jackscrew as the intermediate plate moves relative to the base; and
    a traveling nut disposed upon the jackscrew, the traveling nut moving along the jackscrew as the jackscrew rotates, the actuator link having a crossmember engaging the traveling nut, the crossmember moving with the traveling nut and operating the actuator link due to motion of the traveling nut.

6. The selectable multi-axis shaker table according to claim 5, wherein at least one gear of the gear train is selectively disengageable from the gear train.

* * * * *